United States Patent
Fujita

(10) Patent No.: US 9,096,099 B2
(45) Date of Patent: Aug. 4, 2015

(54) PNEUMATIC TIRE

(71) Applicant: SUMITOMO RUBBER INDUSTRIES, LTD., Kobe-shi, Hyogo (JP)

(72) Inventor: Masayuki Fujita, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 14/161,922

(22) Filed: Jan. 23, 2014

(65) Prior Publication Data

US 2014/0261937 A1    Sep. 18, 2014

(30) Foreign Application Priority Data

Mar. 15, 2013  (JP) .................... 2013-053724

(51) Int. Cl.
*B60C 11/11*     (2006.01)
*B60C 11/03*     (2006.01)

(52) U.S. Cl.
CPC ............. *B60C 11/0302* (2013.04); *B60C 11/11* (2013.01); *B60C 2011/0346* (2013.04); *B60C 2011/0365* (2013.04); *B60C 2011/0367* (2013.04); *B60C 2011/0374* (2013.04)

(58) Field of Classification Search
CPC ...... B60C 11/04; B60C 11/11; B60C 11/033; B60C 11/0311; B60C 11/036; B60C 11/0306; B60C 11/0309; B60C 11/0302; B60C 2011/0374; B60C 2011/0313; B60C 2011/0358; B60C 2011/0311; B60C 2200/06; B60C 2200/065; B60C 2011/0353; B60C 2011/0365; B60C 2011/0376

USPC ............ 152/209.18, 209.12, 209.13, 209.27, 152/209.28; D12/533, 536, 541, 559, 560, D12/575
See application file for complete search history.

(56) References Cited

U.S. PATENT DOCUMENTS

| | | | | |
|---|---|---|---|---|
| D265,187 | S * | 6/1982 | Raluy | D12/558 |
| D549,157 | S * | 8/2007 | Maus et al. | D12/544 |
| D626,499 | S * | 11/2010 | Fujita | D12/559 |
| 2010/0300588 | A1* | 12/2010 | Otsuji | 152/209.16 |
| 2012/0060990 | A1* | 3/2012 | Otsuji | 152/209.28 |
| 2012/0132335 | A1* | 5/2012 | Fujita | 152/209.18 |
| 2013/0206299 | A1* | 8/2013 | Yoda | 152/209.18 |

FOREIGN PATENT DOCUMENTS

| | | | |
|---|---|---|---|
| JP | 61-108005 | * | 5/1986 |
| JP | 2009-132235 A | | 6/2009 |
| WO | WO 2012/053227 | * | 4/2012 |

* cited by examiner

*Primary Examiner* — Eric Hug
(74) *Attorney, Agent, or Firm* — Birch, Stewart, Kolasch & Birch, LLP

(57) ABSTRACT

A pneumatic tire includes a tread portion provided with a tread pattern with a designated rotational direction. The tread pattern includes a plurality of V-shaped main inclined grooves that protrude toward the rotational direction and extend from one tread edge to the other tread edge, a pair of connecting grooves disposed both sides of a tire equator between the circumferentially adjacent main inclined grooves, and a center block divided among the circumferentially adjacent main inclined grooves and the one pair of connecting grooves. The center block has a trapezoidal-like shape that comprises a laterally extending leading edge and a laterally extending trailing edge having an axial length larger than that of the leading edge.

11 Claims, 6 Drawing Sheets

PNEUMATIC TIRE

BACKGROUND OF THE INVENTION

1. Field of the Invention

The present invention relates to a pneumatic tire having a tread pattern that may deliver high wear resistance while maintaining excellent wet grip.

2. Description of the Related Art

Japanese Unexamined Patent Application Publication No. 2009-132235 discloses a pneumatic tire including a tread pattern having a plurality of tread blocks that are divided by a plurality of circumferentially extending main grooves and a plurality of lateral grooves. In order to improve wet grip of the tire above, it is known to increase the groove widths and depths of each main grooves and lateral groove.

However, such a pneumatic tire having large groove volume on the tread pattern tends to have disadvantage of low wear resistance, since the tread blocks easily deform due to its low rigidity.

SUMMARY OF THE INVENTION

The present invention has been worked out in light of the circumstances described above, and has a main object of providing a pneumatic tire having a tread pattern that may deliver high wear resistance while maintaining excellent wet grip. According to one aspect of the present invention, a pneumatic tire includes a tread portion provided with a tread pattern having a designated rotational direction. The tread pattern comprises a plurality of V-shaped main inclined grooves that protrude toward the rotational direction and extend from one tread edge to the other tread edge, a pair of connecting grooves disposed both sides of a tire equator between the circumferentially adjacent main inclined grooves, and a center block divided among the circumferentially adjacent main inclined grooves and the one pair of connecting grooves. The center block has a trapezoidal-like shape that comprises a laterally extending leading edge and a laterally extending trailing edge having an axial length larger than that of the leading edge.

In the aspect of the present invention, the leading edge of the center block includes a center part having an axial length in a range of from 3% in relation to a tread width, and the center part may be configured to a straight manner.

In the aspect of the present invention, the leading edge of the center block includes a central region having an axial length in a range of from 3% in relation to a tread width, and the center region may be configured to an arc having a radius of curvature in a range of not less than 30 mm.

In the aspect of the present invention, the leading edge may have an axial length in a range of from 5% to 20% in relation to a tread width.

In the aspect of the present invention, each inclined main groove comprises a first inclined element extending from the tire equator to one of the tread edge and a second inclined element extending from the tire equator to the other one of the tread edge, and the tread pattern may further include a center lateral groove connecting between the first inclined element and the second inclined element so as to traverse the center block.

In the aspect of the present invention, the center lateral groove may have a groove width in a range of from 1.0 to 7.0 mm.

In the aspect of the present invention, the center lateral groove may have a groove depth in a range of from 50% to 90% in relation to a groove depth of the main inclined groove.

In the aspect of the present invention, the center block includes a first block element between the center lateral groove and the leading edge, and a second block element between the center lateral groove and the trailing edge, the first block element includes a pair of first inclined side edges, the second block element includes a pair of second inclined side edges, and the first inclined side edge and the second inclined side edge may be positioned on the same straight line in each side of the tire equator.

In the aspect of the present invention, the first inclined side edges and the second inclined side edges may be inclined at an angle in a range of from 10 to 30 degrees with respect to a circumferential direction of the tire.

In the aspect of the present invention, the center blocks may be circumferentially arranged at pitches in a range of from 0.5% to 2.0% in relation to a tire circumferential length on the tire equator.

In the aspect of the present invention, the tread pattern has a central region having an axial width of 50% in relation to a tread width, and the central region may have a land ratio in a range of from 30% to 60%.

DETAILED DESCRIPTION

An embodiment of the present invention will be explained below with reference to the accompanying drawings.

Figure 1:
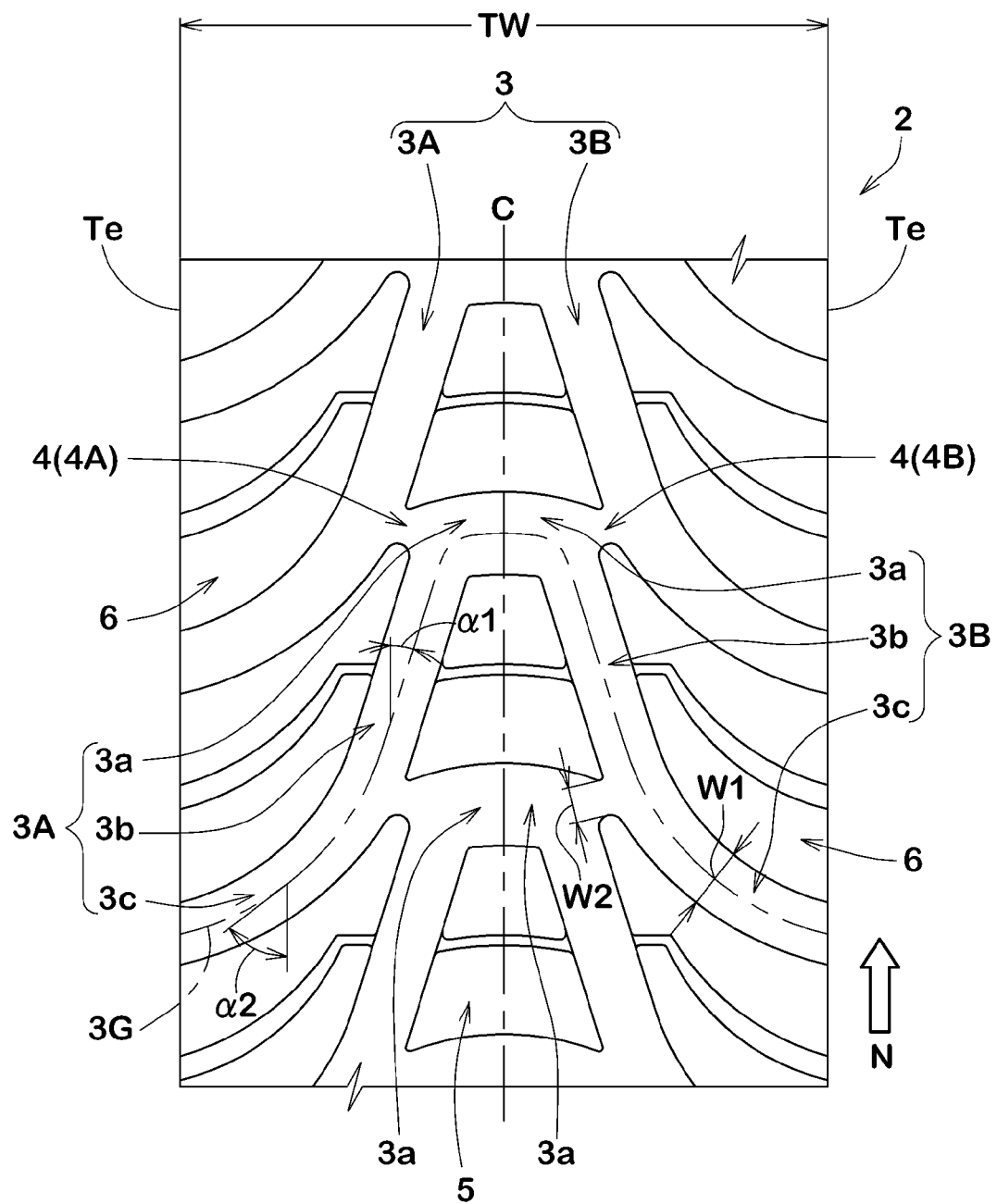
FIG. 1 is a development view of a tread portion of a pneumatic tire in accordance with an embodiment of the present invention.

Referring to FIG. 1, a pneumatic tire in accordance with the present embodiment is suitably used for a four-wheel racing kart. The tire includes a tread portion 2 provided with a tread pattern having a designated rotational direction N. The rotational direction N may be indicated on its sidewall portions (not shown) of the tire using characters or a mark.

The tread pattern comprises a plurality of main inclined grooves 3 spaced in a circumferential direction of the tire, and connecting grooves 4 connecting between the circumferentially adjacent main inclined grooves 4.

Each main inclined groove 3 is configured to a V-shaped (an inverted V-shaped in FIG. 1) that protrude toward the rotational direction N, and extends from one tread edge Te to the other tread edge Te. Thus, the main inclined groove 3 may smoothly drain the water outwardly of the tread portion 2 from a tire equator C through the tread edges Te utilizing the rotation of the tire, thereby improving drainage performance.

Here, the tread edge Te is defined as an axially outer edge in a ground contact patch of the tread portion 2 under a standard loaded condition in which the tire is mounted on a standard wheel rim with a standard pressure and is loaded with a standard tire load at a camber angle of set to zero. The axial distance between the tread edges Te and Te of the tire is defined as its tread width TW.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa. Furthermore, in case of racing kart tires, the standard pressure is uniformly defined by 100 kPa.

The standard tire load is the "maximum load capacity" in JATMA, the "Load Capacity" in ETRTO, and the maximum value given in the above-mentioned table in TRA or the like. In case of passenger car tires, however, the standard tire load is uniformly defined by 88% of the maximum tire load. Furthermore, in case of racing kart tires, the standard tire load is uniformly defined by 392 N.

The main inclined groove 3 comprises a first inclined element 3A extending from the tire equator C to one of the tread edge Te (the left side tread edge in FIG. 1) and a second inclined element 3B extending from the tire equator C to the other one of the tread edge Te (the right side tread edge in FIG. 1).

The respective first inclined element 3A and the second inclined element 3B sequentially include a center portion 3a, middle portion 3b and the shoulder portion 3c, from the tire equator C.

The center portion 3a extends in a short length from the tire equator C axially outwardly while inclining at angle of substantially 90 degrees with respect to the circumferential direction of the tire. Here, the angle of the groove 3 is measured using its groove centerline 3G. When the groove centerline 3G is not straight line, the angle is measured as an angle of its tangent, shown in FIG. 1.

The middle portion 3b extends axially outwardly from the center portion 3a while inclining at an angle $\alpha 1$ smaller than that of the center portion 3a. The middle portion may be subjected to a large ground contact pressure during traveling. Thus, the angle $\alpha 1$ of the middle portion 3b is preferably set in a range of not less than 5 degrees, but preferably less than 45 degrees with respect to the circumferential direction of the tire, in order to smoothly drain the water from the tread portion 2 while using an action of the tire rotation.

The shoulder portion 3c extends axially outwardly from the middle portion 3b while inclining at an angle $\alpha 2$ greater than the angle $\alpha 1$ of the middle portion 3b. The shoulder portion 3c may be subjected to a large ground contact pressure during cornering. The angle $\alpha 2$ of the shoulder portion 3c is preferably set in a range of from 45 to 90 degrees with respect to the circumferential direction of the tire, in order to smoothly drain the water from the tread portion 2 while using lateral force during cornering. Preferably, the angle $\alpha 2$ of the shoulder portion 3c is gradually increasing toward the tread edge Te.

Each portions 3a, 3b and 3c of the main inclined groove 3 in accordance with the present embodiment are smoothly connected one another so as to provide better drainage performance, thereby effectively draining the water from the tire equator C axially outwardly.

The connecting grooves 4 include a first connecting groove 4A to couple between the circumferentially adjacent first inclined elements 3A and 3A, and a second connecting groove 4B to couple between the circumferentially adjacent second inclined elements 3B and 3B.

The connecting grooves 4 are provided axially outside the center portion 3a of the main inclined groove 3. The connecting grooves 4 are inclined toward the tire equator toward the anti-rotational direction N of the tire, for example. The connecting grooves 4 may further improve drainage performance around the tire equator C by dispersing the water toward the main inclined grooves 3.

In order to improve wet grip as well as uneven wear resistance of the tire, the main inclined groove 3 preferably has its groove width W1 in a range of from 5 to 14 mm. Similarly, the connecting groove 4 preferably has its groove width W2 in a range of from 2 to 10 mm. Here, a groove width including above means a width measured perpendicular to a longitudinal direction of the groove. Furthermore, the main inclined groove 3 and the connecting groove 4 preferably have the respective groove depths in a range of from 3 to 7 mm.

The tread portion between main inclined grooves 3 and 3 is separated into a center block 5 and a pair of shoulder blocks 6 disposed axially both sides of the center blocks 5. In this preferred embodiment, the tread pattern is configured to a substantially symmetrically pattern with respect to the tire equator C. However, the tread pattern may be employed a non symmetrical design.

The center block 5 is divided among the circumferentially adjacent main inclined grooves 3, 3, and a pair of connecting grooves 4 and 4. Thus, the center block 5 has a trapezoidal-like shape. In more detail, the center block 5 is surrounded by the circumferentially adjacent center portions 3a of the main inclined grooves 3, a pair of middle portions 3b of the main inclined grooves 3, and a pair of connecting grooves 4. Here, the trapezoidal-like shape block means a block that has an axially extending leading and trailing edges 9 and 10 (shown in FIG. 2), and is not be required to have the trapezoidal shape according to the exact meaning.

Figure 2:
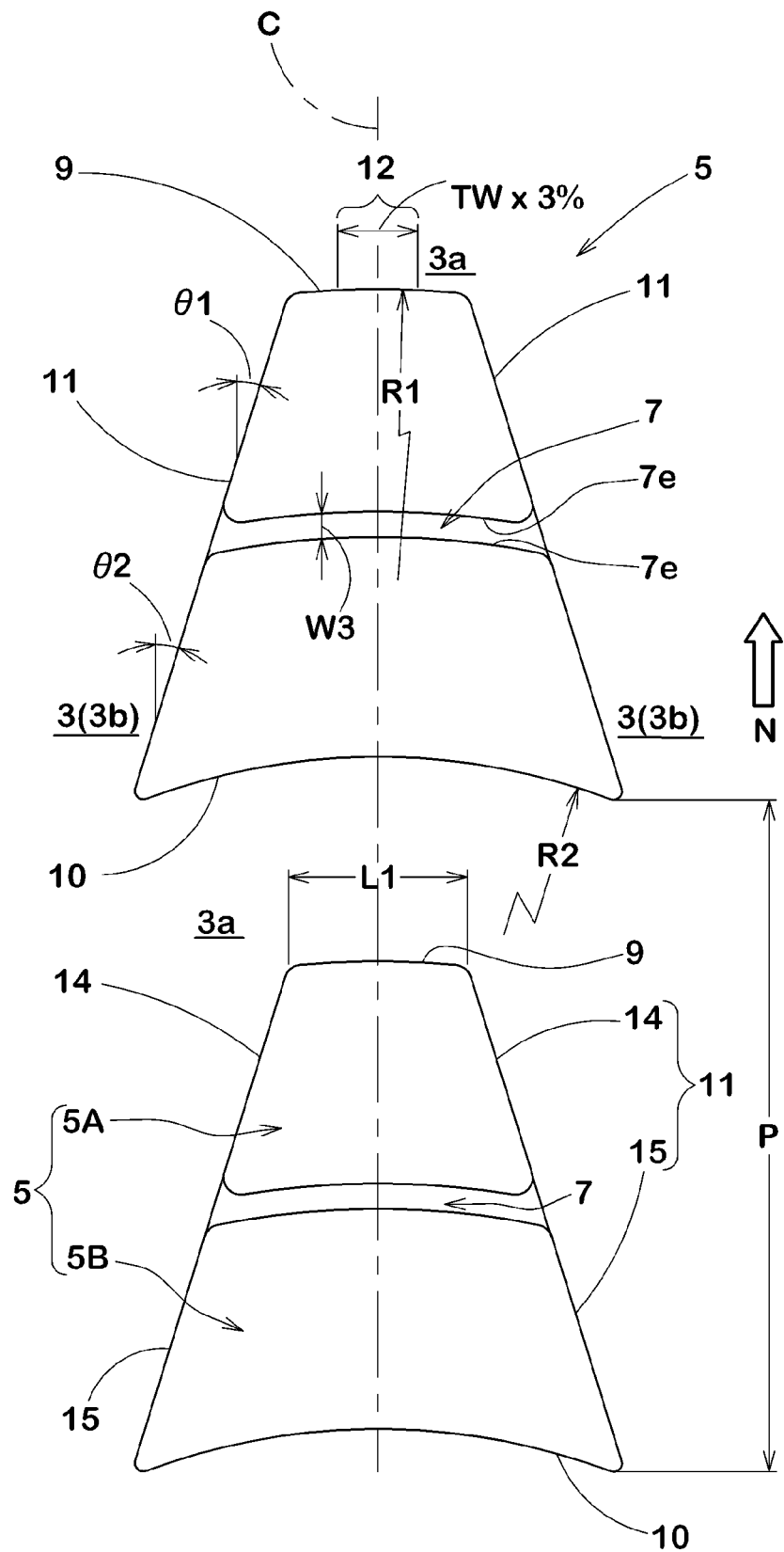
FIG. 2 is a partial enlarged view of a center block of FIG. 1.

FIG. 2 shows an enlarged vies of center blocks 5. Referring to FIGS. 1 and 2, the center block 5 is provided with a center lateral groove 7 connecting between the first inclined element 3A and the second inclined element 3B. Thus, each center block 5 is separated into a first block element 5A between the center lateral groove 7 and the leading edge 9, and a second block element 5B between the center lateral groove 7 and the trailing edge. Since the center block 5 tends to have low rigidity around its center lateral groove 7, the center block may help to increase friction force by offering suitable contacting state against the road when braking. Furthermore, the center lateral groove 7 may effectively drain the water toward the main inclined groove 4, thereby improving wet grip.

The center lateral groove 7 includes a pair of groove edges 7e and 7e that are configured to an arc shape protruding toward the rotational direction N of the tire, respectively. Such a center lateral groove 7 may further effectively drain the water backwardly utilizing rotational action of the tire, while improving wear resistance of the center block 5.

Preferably, the center lateral groove 7 has a groove width W3 in a range of from 1.0 to 7.0 mm. Thus, the first block element 5A and the second block element 5B may support each other to maintain large rigidity of the center block 5, when large circumferential shearing force is applied to the center block 5. When the groove width W3 of the center lateral groove is less than 1.0 mm, drainage performance of the tire may be deteriorated. When the groove width W3 of the center lateral groove is more than 7.0 mm, the first block element 5A and the second block element 5B may not support each other when large shearing force is applied, thereby deteriorating wear resistance of the center block 5.

In order to further improve wear resistance and wet grip performance in well balance, the center lateral groove 7 preferably has its groove depth (not shown) in a range of not less than 50%, more preferably not less than 60%, but preferably not more than 90%, more preferably not more than 80%, in relation to the groove depth of the main inclined groove 3.

The center block 5 includes the leading edge 9, the trailing edge 10 having its axial length larger than that of the leading edge 9, and a pair of inclined side edges 11.

The leading edge 9 includes a center part 12 having its center corresponding to the tire equator C and its width of 3% in relation to the tread width TW. The center part 12 of the leading edge 9 is preferably configured to an arc protruding toward the rotational direction N of the tire with a radius R1 of curvature in a range of not less than 30 mm. Since such a center part 12 tends to improve rigidity of the leading edge 9, the center block 5 may offer high wear resistance. More preferably, the radius R1 of curvature of the center part 12 is preferably set in a range of not less than 45 mm. Furthermore, in another aspect of the embodiment, the center part 12 may be configured to an axially extending straight line.

Preferably, the leading edge 9 of the center block 9 has its axial length L1 in a range of from 5% to 20%, more preferably in a range of from 7% to 18% in relation to the tread width TW, in order to further improve wear resistance as well as wet grip performance of the tire. When a chamfer arc is provided between the leading edge 9 and the inclined side edge 11, the end of the leading edge is defined as its center point on the chamfer arc.

The trailing edge 10 has its axial length larger than that of the leading edge 9. Furthermore, the trailing edge 10 may be configured to an arc shape that protrudes toward the rotational direction N of the tire. Thus, the center block 5 may have high circumferential rigidity, thereby further improving wear resistance as well as wet grip. Preferably, the arc shape of the trailing edge 10 has its radius R2 of curvature in a range of not less than 15 mm, in order to further improve the circumferential rigidity of the center block 5. Furthermore, in another aspect of the embodiment, the trailing edge 10 may be configured to an axially extending straight line.

Each inclined side edge 11 of the center block 5 includes a first inclined side edge 14 on the first block element 5A, and a second side edge 15 on the second block element 5B. In each side of the tire equator C, the first inclined side edge 14 and the second inclined side edge 15 are positioned on the same straight line or single arc. Thus, wet grip performance around both sides of the center block 5 may be improved due to better drainage performance of the main inclined grooves 3. When the first inclined side edge 14 and the second inclined side edge 15 are positioned on the single arc, the arc preferably has its radius in a range of not less than 20 mm. Furthermore, the arc 11 may protrude either toward the tread edge or the tire equator C.

In order to further improve the advantage above, the respective angles θ1 and θ2 of the first inclined side edge 14 and the second inclined side edge 15 are preferably set in a range of from 10 to 30 degrees with respect to the circumferential direction of the tire. When the angles θ1 and θ2 are less than 10 degrees, wear resistance of the center block 5 may be deteriorated due to its low circumferential rigidity. When the angles θ1 and θ2 are more than 30 degrees, wet grip of the tire may be deteriorated.

In order to further improve the advantage above, the center blocks 5 are circumferentially arranged at pitches P in a range of from 0.5% to 2.0% in relation to a tire circumferential length on the tire equator C., for example.

Figure 3:
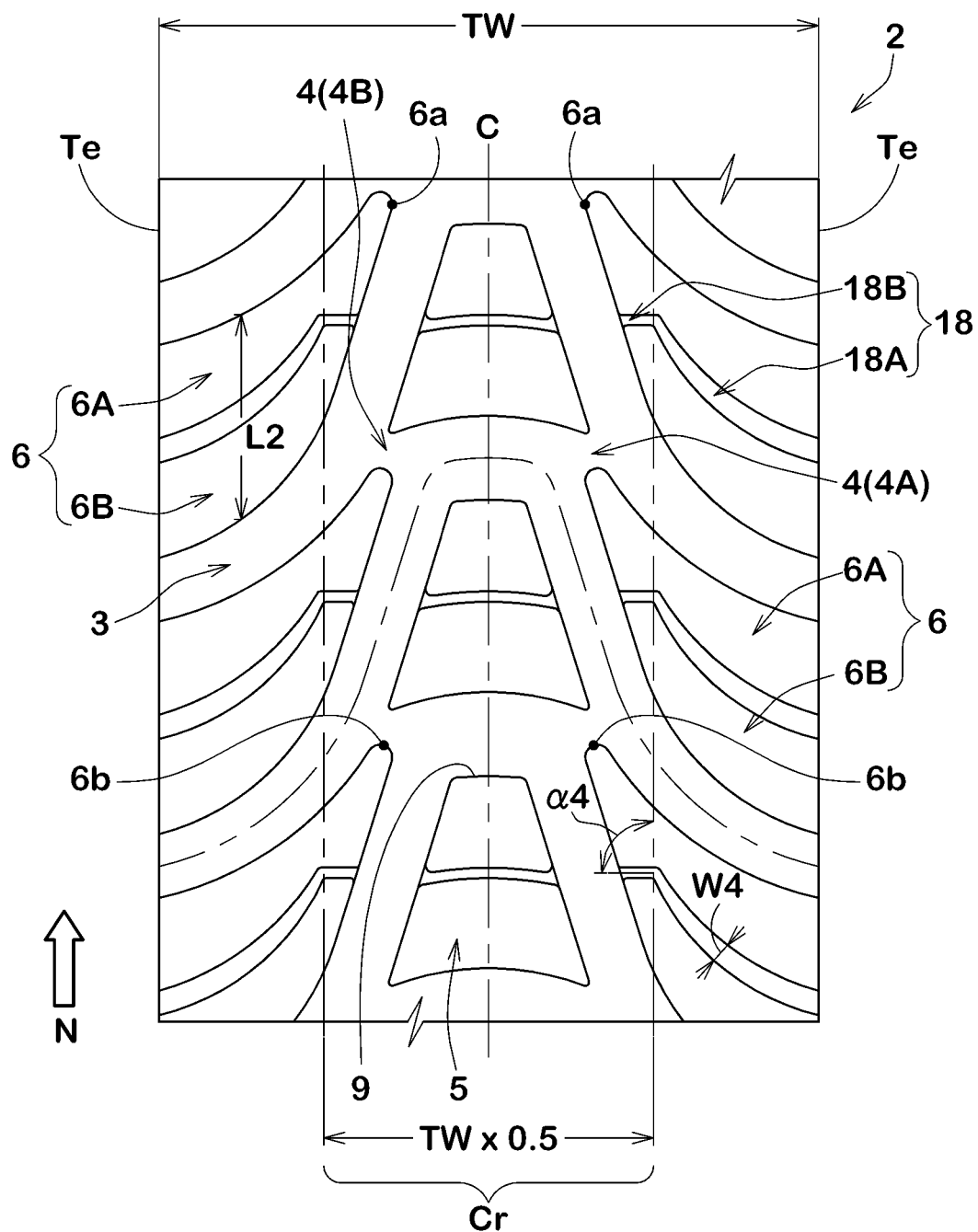
FIG. 3 is a development view of the tread portion.

Referring to FIG. 3, each shoulder block 6 is configured to a tapered shape toward the tire equator C so as to reduce its circumferential length L2. The shoulder block 6 may have large circumferential rigidity and ground contact area toward the tread edge Te, thereby further improving wear resistance of the tire.

The shoulder block 6 is provided with a shoulder lateral groove 18. Thus, each shoulder block 6 is divided into a leading shoulder portion 6A and a trailing shoulder portion 6B.

The shoulder lateral groove 18 includes a curved portion 18A extending along the main inclined groove 3, and a straight portion 18B disposed inwardly of the curved portion 18A and extending substantially along the axial direction of the tire. Such a shoulder lateral groove 18 may deliver better drainage performance as well as high pattern rigidity of the shoulder block 6, thereby further improving wear resistance. The straight portion 18B is preferably inclined at angle α4 in a range of not less than 80 degrees with respect to the circumferential direction of the tire, in order to further improve pattern rigidity at its axially inner portion.

In this embodiment, the shoulder block 6 has its leading point 6b that is positioned forwardly with respect to the leading edge 9 of the center block 5 adjacent to the shoulder block 6 in the axial direction of the tire. Thus, ground contact force acting to the leading edge 9 of the center block 5 during traveling may be reduced by dispersing to both shoulder blocks 9.

The tread pattern 2 has a central region Cr having an axial width of 50% in relation to the tread width TW. Preferably, the central region Cr is configured to a pattern with a land ratio in a range of from 30% to 60%, in order to further improve wear resistance as well as wet grip performance of the tire. More preferably, the central region Cr has the land ratio in a range of from 40% to 50%. Here, the land ratio of the central region Cr is defined as a ratio Mb/Ma of the net ground contact area Mb to the gross ground contact area Ma that is obtained by plugging all grooves up, in the central region Cr.

The present invention is more specifically described and explained by means of the following Examples and References. It is to be understood that the present invention is not limited to these Examples and embodiments described above.

Comparison Test

Pneumatic tires for a four-wheel racing kart shown in FIG. 1 and Table 1 were manufactured and tested. Major common specifics of the tires and test methods are as follows.

Details of Test Tires:
    Tread width TW: 95 mm
    Main inclined groove depth: 5.0 mm
    Connecting groove depth: 5.0 mm
    Shoulder lateral groove depth: 5.0 mm Traction and Braking Performance Test:

The test tires were installed to a four-wheel racing kart of 100 cc displacement, as its whole wheels under the following condition. Then, traction and braking performance on a dry asphalt road was evaluated by the driver's feeling. The test results were indicated using a score based on Ex.1 being 5.0 in Table 1. The larger the score, the better the performance is.

Front/Rear
    Size: 10×4.50-5/11×6.50-5
    Rim: 4.5/6.5
    Internal pressure: 100 kPa/100 kPa Wet Grip Performance:

The test driver drove the racing kart above on a wet asphalt road with a puddle 5 mm deep, and evaluated its wet grip performance by the driver's feeling. The test results were evaluated using a score based on Ex.1 being 5.0 in Table 1. The larger the score, the better the performance is.

Time Trial Test:

The test driver did a time trial of 7 laps using the racing kart above on a test course of 734 m long under wet condition with a puddle 5 mm deep and dry condition, respectively. The test results were evaluated using the total lap time of wet and dry conditions, and were indicated as a score under the following conditions:

1.0: The difference between the best time and the time to be evaluated is equal to 3.0 seconds or more;
1.5: The difference between the best time and the time to be evaluated is not less than 2.5 seconds, but less than 3.0 seconds;
2.0: The difference between the best time and the time to be evaluated is not less than 2.0 seconds, but less than 2.5 seconds;
2.5: The difference between the best time and the time to be evaluated is not less than 1.5 seconds, but less than 2.0 seconds;
3.0: The difference between the best time and the time to be evaluated is not less than 1.0 seconds, but less than 1.5 seconds;
3.5: The difference between the best time and the time to be evaluated is not less than 0.5 seconds, but less than 1.0 seconds;
4.0: The difference between the best time and the time to be evaluated is not less than 0.2 seconds, but less than 0.5 seconds;
4.5: The difference between the best time and the time to be evaluated is less than 0.2 seconds; and
5.0: The difference between the best time and the time to be evaluated is zero.

Wear Resistance Test:

After doing the time attack above, abrasion generated on the tread portion of each test tire was checked and scored using the following standard.
1: Critical level abrasion was generated.
2: Middle level abrasion was generated.
3. Low level abrasion was generated.
4. Very small abrasion was generated.
5. No abrasion was generated.

Total Performance:

Test results are shown in Table 1 using an average score of the traction performance, braking performance, wet grip, and time trial, and wear resistance tests.

TABLE 1

Figure 6A:
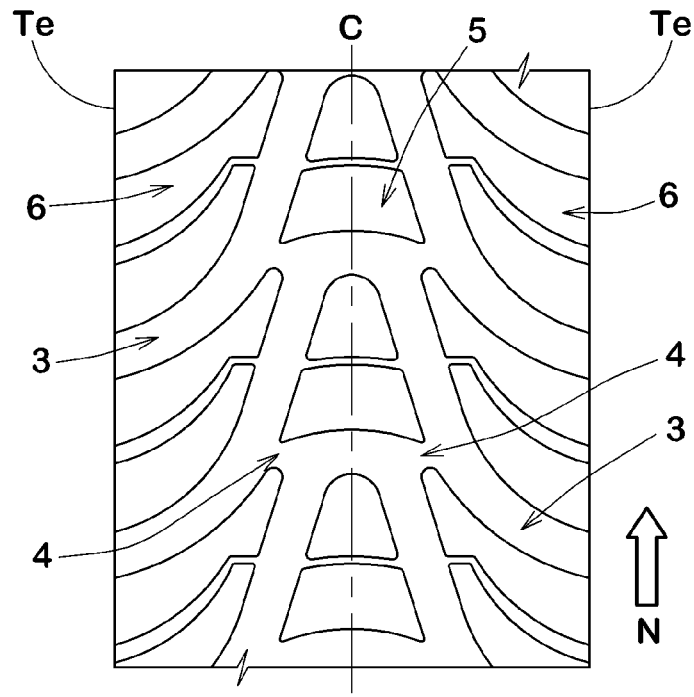
FIGS. 6A and 6B are development views of tread portions in accordance with the comparative examples.
Figure 6B:
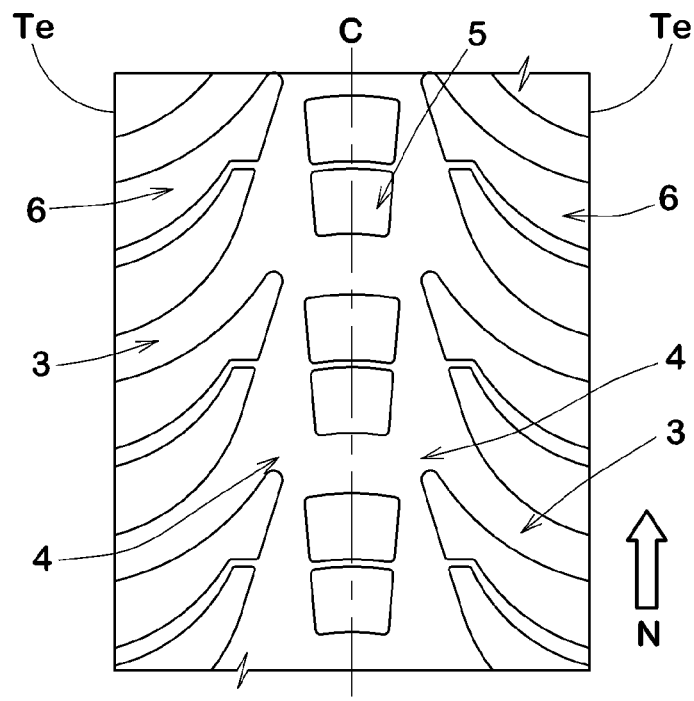

|  | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Tread pattern | FIG. 6A | FIG. 6B | FIG. 1 | FIG. 1 | FIG. 1 | FIG. 1 | FIG. 1 | FIG. 1 | FIG. 1 | FIG. 1 |
| Center lateral groove width W3 (mm) | 3 | 3 | 3 | 0.5 | 1 | 7 | 8 | 3 | 3 | 3 |
| Center lateral groove depth/Main inclined groove depth (%) | 60 | 60 | 60 | 60 | 60 | 60 | 60 | 40 | 50 | 90 |
| Central region land ratio (%) | 55 | 50 | 45 | 65 | 60 | 30 | 20 | 45 | 45 | 45 |
| Center blocks pitches/Tire circumferential length (%) | 1.5 | 1.5 | 1.5 | 1.5 | 1.5 | 1.5 | 1.5 | 1.5 | 1.5 | 1.5 |
| First inclined element angle θ1 (deg) | 20 | 20 | 20 | 20 | 20 | 20 | 20 | 20 | 20 | 20 |
| Second inclined element angle θ2 (deg) | 20 | 20 | 20 | 20 | 20 | 20 | 20 | 20 | 20 | 20 |
| Leading edge axial length L1/Tread width TW (%) | 10 | 10 | 10 | 10 | 10 | 10 | 10 | 10 | 10 | 10 |
| Wear resistance (Score) | 3 | 3 | 5 | 5 | 5 | 4 | 3 | 4 | 5 | 5 |
| Traction performance (Score) | 3.5 | 3.5 | 5 | 4.5 | 4.5 | 4 | 4 | 4.5 | 5 | 4.5 |
| Wet grip performance (Score) | 4 | 4 | 5 | 4 | 4 | 4.5 | 4.5 | 4 | 4.5 | 4.5 |
| Braking performance (Score) | 4 | 4 | 5 | 3.5 | 4 | 5 | 5 | 3.5 | 4.5 | 5 |
| Time trial (Score) | 4 | 4 | 5 | 3.5 | 4.5 | 4.5 | 4 | 4 | 4.5 | 4.5 |
| Total performance (Avg. score) | 3.7 | 3.7 | 5 | 4.1 | 4.4 | 4.4 | 4.1 | 4 | 4.7 | 4.7 |

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 | FIG. 1 |
| Center lateral groove width W3 (mm) | 3 | 3 | 3 | 3 | 3 | 3 | 3 | 3 | 3 | 3 |
| Center lateral groove depth/Main inclined groove depth (%) | 95 | 60 | 60 | 60 | 60 | 60 | 60 | 60 | 60 | 60 |
| Central region land ratio (%) | 45 | 25 | 30 | 60 | 65 | 25 | 45 | 60 | 65 | 25 |
| Center blocks pitches/Tire circumferential length (%) | 1.5 | 1.5 | 1.5 | 1.5 | 1.5 | 0.3 | 0.5 | 2 | 2.5 | 1.5 |
| First inclined element angle θ1 (deg) | 20 | 20 | 20 | 20 | 20 | 20 | 20 | 20 | 20 | 5 |
| Second inclined element angle θ2 (deg) | 20 | 20 | 20 | 20 | 20 | 20 | 20 | 20 | 20 | 5 |
| Leading edge axial length L1/Tread width TW (%) | 10 | 10 | 10 | 10 | 10 | 10 | 10 | 10 | 10 | 10 |
| Wear resistance (Score) | 3 | 3 | 4 | 5 | 5 | 4 | 5 | 5 | 5 | 3 |
| Traction performance (Score) | 4.5 | 4 | 4.5 | 4.5 | 5 | 4 | 4.5 | 5 | 4 | 4 |
| Wet grip performance (Score) | 4.5 | 5 | 5 | 4 | 3.5 | 5 | 5 | 5 | 4 | 4.5 |
| Braking performance (Score) | 4.5 | 4.5 | 4.5 | 4 | 3 | 4 | 4.5 | 5 | 4 | 4.5 |
| Time trial (Score) | 4 | 4 | 4.5 | 4.5 | 4 | 4.5 | 4.5 | 4.5 | 4 | 4.5 |
| Total performance (Avg. score) | 4.1 | 4.1 | 4.5 | 4.4 | 4.1 | 4.3 | 4.7 | 4.9 | 4.2 | 4.1 |

Figure 4A:
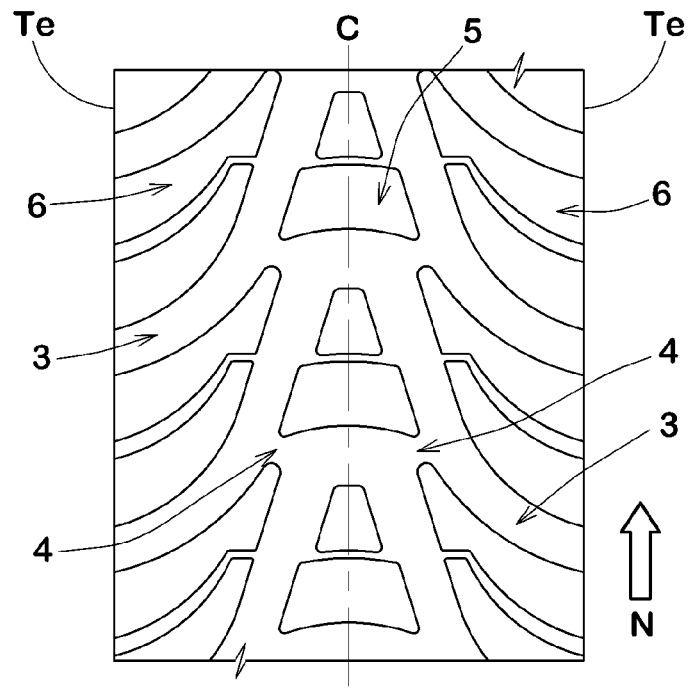
FIGS. 4A and 4B are development views of tread portions in accordance with the other embodiments of the present invention.
Figure 4B:
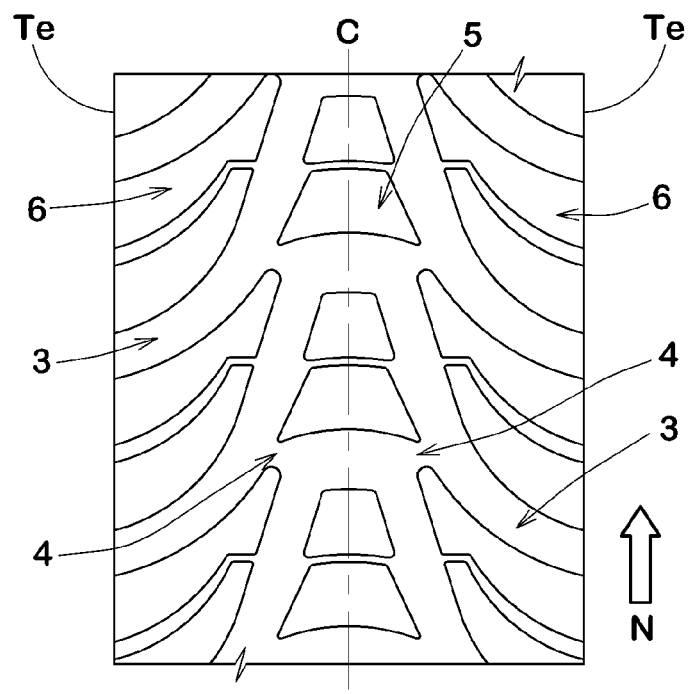
Figure 5A:
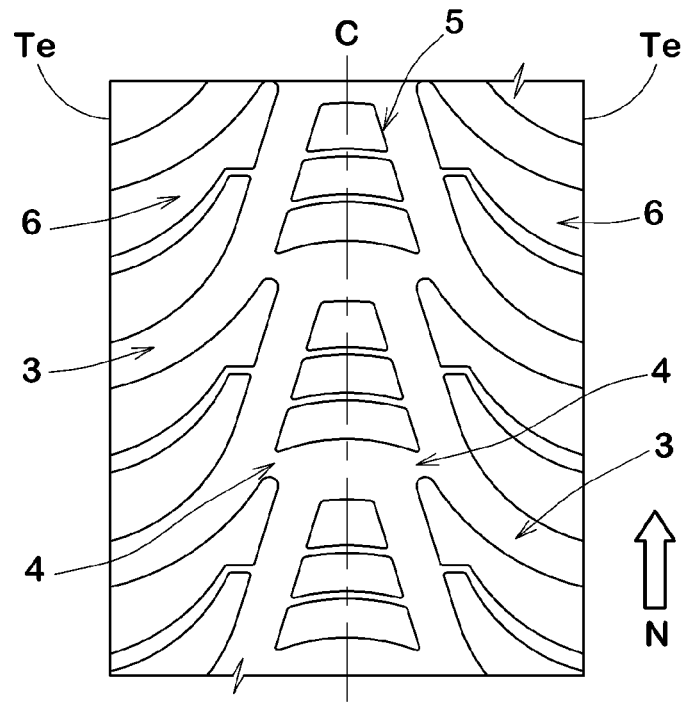
FIGS. 5A and 5B are development views of tread portions in accordance with the other embodiments of the present invention.
Figure 5B:
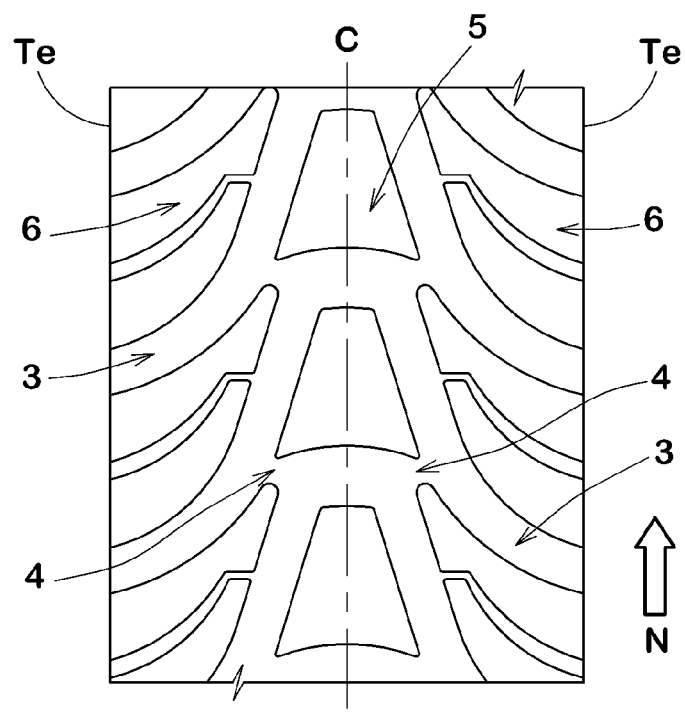

|  | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 4A | FIG. 4B | FIG. 5A | FIG. 5B |
| Center lateral groove width W3 (mm) | 3 | 3 | 3 | 3 | 3 | 3 | 3 | 3 | 3 | 3 | — |
| Center lateral groove depth/Main inclined groove depth (%) | 60 | 60 | 60 | 60 | 60 | 60 | 60 | 60 | 60 | 60 | — |
| Central region land ratio (%) | 30 | 60 | 65 | 45 | 45 | 45 | 45 | 45 | 45 | 40 | 50 |
| Center blocks pitches/Tire circumferential length (%) | 1.5 | 1.5 | 1.5 | 1.5 | 1.5 | 1.5 | 1.5 | 1.5 | 1.5 | 1.5 | 1.5 |

TABLE 1-continued

| | | | | | | | | | | | |
|---|---|---|---|---|---|---|---|---|---|---|---|
| First inclined element angle θ1 (deg) | 10 | 30 | 35 | 20 | 20 | 20 | 20 | 20 | 20 | 20 | 20 |
| Second inclined element angle θ2 (deg) | 10 | 30 | 35 | 20 | 20 | 20 | 20 | 20 | 20 | 20 | 20 |
| Leading edge axial length L1/Tread width TW (%) | 10 | 10 | 10 | 3 | 5 | 20 | 23 | 10 | 10 | 10 | 10 |
| Wear resistance (Score) | 4 | 5 | 5 | 3 | 4 | 5 | 5 | 4 | 5 | 4 | 5 |
| Traction performance (Score) | 4.5 | 4.5 | 4.5 | 4 | 4.5 | 4.5 | 4.5 | 4 | 4 | 4 | 5 |
| Wet grip performance (Score) | 4.5 | 4.5 | 3.5 | 4.5 | 4.5 | 4.5 | 3.5 | 4 | 4 | 5 | 3.5 |
| Braking performance (Score) | 4.5 | 4.5 | 4 | 4.5 | 4.5 | 4.5 | 4 | 4 | 4 | 5 | 4 |
| Time trial (Score) | 4.5 | 4.5 | 4 | 4.5 | 4.5 | 4.5 | 4 | 4 | 4 | 4 | 4 |
| Total performance (Avg. score) | 4.4 | 4.6 | 4.2 | 4.1 | 4.4 | 4.6 | 4.2 | 4 | 4.2 | 4.4 | 4.3 |

The test results show that the example tires in accordance with the present invention have excellent performance in well balance as compared to the reference tires. Although the same tests were done using different tires in size, the same results above were confirmed.

What is claimed is:

1. A pneumatic tire comprising a tread portion provided with a tread pattern having a designated rotational direction, the tread pattern comprising
a plurality of V-shaped main inclined grooves that protrude toward the rotational direction and extend from one tread edge to the other tread edge,
a pair of connecting grooves disposed both sides of a tire equator between the circumferentially adjacent main inclined grooves, and
a center block divided among the circumferentially adjacent main inclined grooves and the one pair of connecting grooves, and
the center block having a trapezoidal-like shape that comprises a laterally extending leading edge and a laterally extending trailing edge having an axial length larger than that of the leading edge,
wherein the center blocks in said tread pattern are circumferentially arranged at pitches in a range of from 0.5% to 2.0% in relation to a tire circumferential length on the tire equator.

2. The tire according to claim 1, wherein
the leading edge of the center block comprises a center part having an axial length in a range of from 3% in relation to a tread width, and
the center part is configured to a straight manner.

3. The tire according to claim 1, wherein
the leading edge of the center block comprises a central region having an axial length in a range of from 3% in relation to a tread width, and
the center region is configured to an arc having a radius of curvature in a range of not less than 30 mm.

4. The tire according to claim 1, wherein the leading edge has an axial length in a range of from 5% to 20% in relation to a tread width.

5. The tire according to claim 1, wherein each of the center blocks is provided with a center lateral groove to divide the center block into a first block element between the center lateral groove and the leading edge and a second block element between the center lateral groove and the trailing edge.

6. The tire according to claim 5, wherein the center lateral groove has a groove width in a range of from 1.0 to 7.0 mm.

7. The tire according to claim 5, wherein the center lateral groove has a groove depth in a range of from 50% to 90% in relation to a groove depth of the main inclined groove.

8. The tire according to claim 5, wherein
the first block element comprises a pair of first inclined side edges,
the second block element comprises a pair of second inclined side edges, and
the first inclined side edge and the second inclined side edge are positioned on the same straight line in each side of the tire equator.

9. The tire according to claim 8, wherein the first inclined side edges and the second inclined side edges are inclined at an angle in a range of from 10 to 30 degrees with respect to a circumferential direction of the tire.

10. The tire according to claim 1, wherein
the tread pattern has a central region having an axial width of 50% in relation to a tread width, and
the central region has a land ratio in a range of from 30% to 60%.

11. A pneumatic tire comprising a tread portion provided with a tread pattern having a designated rotational direction, the tread pattern comprising
a plurality of V-shaped main inclined grooves that protrude toward the rotational direction and extend from one tread edge to the other tread edge,
a pair of connecting grooves disposed both sides of a tire equator between the circumferentially adjacent main inclined grooves, and
a center block divided among the circumferentially adjacent main inclined grooves and the one pair of connecting grooves, the center block having a trapezoidal-like shape that comprises a laterally extending leading edge and a laterally extending trailing edge having an axial length larger than that of the leading edge, wherein each of the center blocks is provided with a center lateral groove to divide the center block into a first block element between the center lateral groove and the leading edge, and a second block element between the center lateral groove and the trailing edge.

* * * * *